May 24, 1949.  W. P. HAMMERS  2,470,891
SPEED NUT TOOL
Filed March 18, 1947
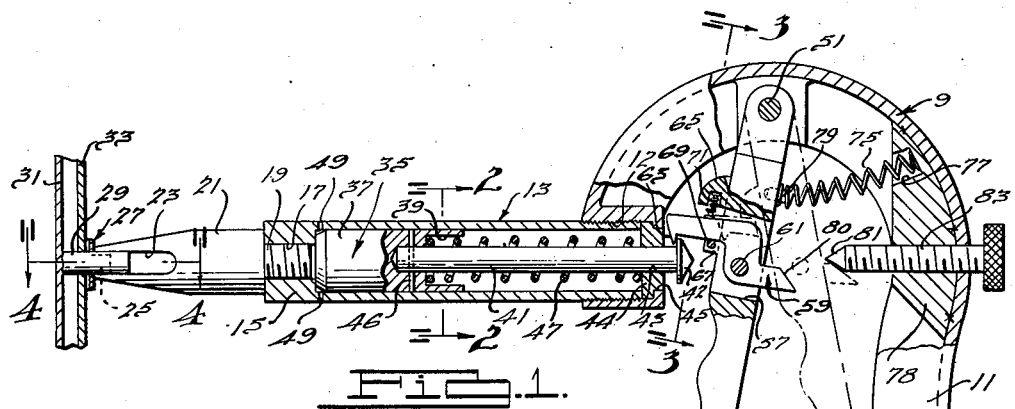
INVENTOR.
William P. Hammers.
BY
Harness, Dickey & Pierce.
ATTORNEYS Patented May 24, 1949

2,470,891

UNITED STATES PATENT OFFICE 2,470,891

SPEED NUT TOOL

William P. Hammers, Detroit, Mich., assignor to Hammers, Incorporated, Detroit, Mich., a corporation of Michigan Application March 18, 1947, Serial No. 735,389

7 Claims. (Cl. 81—3)

This invention relates generally to force applying tools, and more particularly to an improved tool for applying and setting speed nuts.

Heretofore, it has been the practice to apply speed nuts, for securing together associated members, by using a tool through which manual force is applied to push the speed nuts onto either a threaded or cylindrical shank, in order to lock the associated members together. This method of applying speed nuts has not proved entirely satisfactory, due to the fact that a great amount of pressure must be exerted to push the speed nut over the shank, and also due to the fact that the speed nut cannot be properly set or locked by the pushing force exerted on the tool without an undue amount of exertion on the part of the operator.

The tool of this invention comprises a manually operated device having a magnetic end adapted to receive and magnetically hold a speed nut so that the latter will be held in position while pushed onto an associated shank by the tool, and having within the body thereof a spring operated inertia member adapted to sharply strike the magnetic end member to set the speed nut and lock it firmly on the shank in an abutting relation with one of the associated members. In order to accomplish this, the tool of this invention employs a trigger mechanism for cocking the inertia member and releasing it under a predetermined pressure so that the inertia member will strike the magnetic handle end with a predetermined force to thereby set the speed nut under a desired stressed condition.

Accordingly, it is an object of this invention to provide a tool for applying speed nuts, so as to secure together associated members, which has a magnetic end adapted to receive and hold a speed nut so that it may be easily applied by the tool to the associated members; to provide in a tool of the aforementioned type a removable magnetic end so that the tool may be used with various sized speed nuts; to provide in the tool of the aforementioned type a spring operated inertia member adapted to sharply strike the magnetic end to set or lock the speed nut on its associated member; to provide a trigger mechanism for cocking and releasing the inertia member; to provide an adjustable cam means for releasing the inertia member under a predetermined pressure; to provide means for automatically re-engaging the trigger means with the spring inertia means after the same has been released from said trigger means; and to provide in general an improved type speed nut tool which is inexpensive to manufacture, especially efficient in operation, and rugged in construction.

These and other objects of this invention will become apparent from the following detailed description taken in conjunction with the accompanying drawing in which:

Figure 1 is a side elevational view with parts broken away of the tool of this invention, showing it operatively associated with a speed nut holding a pair of parts together;

Fig. 2 is an enlarged transverse sectional view of the structure illustrated in Fig. 1 taken along the line 2—2 thereof;

Fig. 3 is a transverse sectional view of the structure illustrated in Fig. 1 taken along the line 3—3 thereof;

Fig. 4 is a sectional view of the forward end portion of the structure illustrated in Fig. 1 taken along the line 4—4 thereof;

Fig. 5 is a fragmentary, partially broken, side elevational view similar to Fig. 1 and illustrating the tool used on a modified form of speed nut;

Fig. 6 is a perspective view of the speed nut illustrated in Fig. 5;

Fig. 7 is a perspective view of the removable magnetic end of the tool.

Referring now to the drawing, it will be seen that the tool of this invention comprises a generally inverted U-shaped handle, indicated at 9, which is channel-shaped in cross section. The rear leg 11 of the handle forms a hand grip for the tool and the forward end of the handle is recessed at 12 to threadably receive the rear end of a hollow cylindrical tube 13 forming a body or housing. The forward end of the housing 13 is thickened as at 15 and the bore of this thickened end is threaded as at 17 to receive a threaded stem 19 of a magnetized hardened steel end member 21. The magnetized end member 21 is provided, as can be seen in Fig. 7, with an axial slot 23 extending rearwardly from the forward end thereof adapted to receive therein the tabs 25 of a speed nut, generally indicated at 27. The end member 21 will magnetically hold the speed nut 27 on its forward end so that the speed nut may be pushed by the tool onto a cylindrical shank 29 of a member such as 31. The opposite faces of the slot 23 are formed with arcuate longitudinal recesses 32 providing clearance to permit reception of the shank 29, which thus serves to guide the end 21 into proper position with respect thereto during application of a nut. The shank 29 is shown as extending through an associated member 33, so that when the speed nut 27 is applied to the shank 29, the latter will be received within the slot 23. The speed nut 27 therefore can be pushed onto the shank 29 into an abutting relation with the associated member 33 so as to lock the members 31 and 33 together.

After the speed nut has been pushed onto the shank 29 so as to abut against the associated member 33, it is desirable to apply a final setting blow to the speed nut to firmly lock it and the associated members together. This is accomplished in the tool of this invention by means of an inertia member, generally indicated at 35, which is slidably mounted within the body 13. The inertia member 35 comprises a head 37 having a recess 39 in the rear end thereof in which is received the forward end of a plunger 41. The opposite end of the plunger 41 is enlarged to provide a conical shaped end 42 which forms a forwardly facing shoulder on the extreme rear end of the plunger. The forward end of the plunger is inserted through an aperture 43 in a shouldered and preferably hardened steel bushing 44 which is received in the handle recess 12 and pressed into an aperture 45 in the rear wall of the handle front leg so that when the body 13 is threaded into the recess 12 it will abut the bushing 44 and lock it in place. The bushing 44 therefore acts as a wear ring for the plunger 41 when it is cocked and released, as will be brought out below. The forward end of the plunger 41 is connected to the head 37, within the recess 39, by means of a transverse pin 46. Surrounding the plunger 41 within the body 13 is a coil spring 47, the forward end of which is received in the head recess 39 and the rear end of which is received in the handle recess 12 and abuts the bushing 44 so that when the plunger is pulled rearwardly, as will be hereinafter brought out, the spring 47 will be compressed, and when the plunger is released the head 37 will be driven forwardly by the spring and will strike the body thickened wall 15 with a sharp blow. The body 13 is provided with a plurality of air vent apertures 49, just rearwardly of the thickened wall 15, to prevent any air from being trapped between the head 37 and the thickened wall 15 and thereby softening the blow of the inertia member, when the plunger is released.

The enlarged conical end 42 of the plunger is disposed rearwardly of the front leg of the handle 9 when the tool is assembled. When the body 13 is threaded into the handle 9, the forward end of the inertia element head 37 abuts the body thickened wall 15 and is forced rearwardly so that the plunger end 42 is spaced rearwardly of the front leg of the handle for a reason that will appear below.

Pivotally connected in the upper end of the handle 9, by means of a pivot pin 51, is a trigger member 53 having finger engaging depressions 55 formed in the front face thereof. Above the finger depressions 55, the trigger member 53 is provided with a rectangular aperture 57 in which a latch element 59 is pivotally mounted by means of a pin 61. The forward end of the latch element 59 is inclined down and to the rear to form a lip 63 adapted to engage the conical end 42 of the plunger 41, to cock the inertia member 35 as will be hereinafter brought out.

Mounted on the front face of the trigger 53, adjacent the upper end of the aperture 57, is a bracket member 65 having downwardly depending legs 67 positioned on opposite sides of the aperture 57. A transverse pin 69 extends between and is supported in the legs 67 adjacent the lower end thereof to limit the downward movement of the latch 59. The upper end of the bracket member 65 is recessed to receive a coil spring 71, the lower end of which is received in a recess 73 in the upper face of the latch 59, rearwardly of the lip 63. The spring 71 resiliently urges the forward end of the latch 59 downwardly so as to normally retain the lip 63 in engagement with the conical end of the plunger 41.

The trigger 53 is normally held in a forward position, as shown in full lines in Fig. 1, by means of a coil spring 75, the rear end of which is received in a recess 77 in a block 78 fixed within the channel portion of the rear leg 11 of the handle. The forward end of the spring 75 is inserted over the free end of a pin or boss 79 projecting from the rear face of the trigger 53 above the aperture 57 therein.

The rear end of the latch element 59 is offset downwardly from its forward end and is provided with an inclined end face 80 which is adapted to abut the conically shaped end 81 of a screw 83 which is threadably received in the block 78 fixed in the rear leg 11 of the handle. The inclined end face 80 of the latch will abut the conical end of the screw 83 when the trigger is pulled rearwardly and when the abutment occurs the rear end of the latch will be cammed downwardly, thereby raising the forward end of the latch and releasing the plunger 41. The screw 83 can be adjusted forwardly or rearwardly to vary the point at which the inclined face 80 of the latch will abut the conical screw end 81 so as to vary the compressive value of the inertia spring 47 and control the strength of the blow struck by the inertia element head 37.

In operation, the speed nut 27 is pushed by the tool onto the associated shank 29. The shank will be received in the recesses 32 on oppposite sides of the slot 23 to thereby center the tool on the shank and guide it during the pushing operation. When the speed nut abuts against the member 33, the trigger 53 is pulled rearwardly by the operator of the tool so as to cock the inertia element 35. When the inclined face 80 on the rear end of the latch 59 comes in contact with the conical screw end 81 it will be cammed downwardly by the screw end and will cause the lip 63 on the forward end of the latch 59 to raise upwardly and release the plunger 41. The plunger head 37 will thus be driven forwardly by the spring 47 and will strike the thickened wall 15 of the body 13 and impart a final blow, through the magnetized end 21, for setting the speed nut 27 on its associated member.

As can be seen in Figs. 5 and 6, a speed nut 89 may be employed in which the tabs 91 therefor have arcuate inner edges 93 adapted to be received on a screw 95 which is provided for securing the associated members 97 and 99 together, in place of the cylindrical shank 27 previously described. This speed nut 89 is held on the magnetic end of the tool in the same manner as previously described, and is pushed over the threads on the screw and locked thereon in the same manner as that previously described.

I claim:

1. A tool for applying speed nuts to associated members so as to secure the latter together comprising a body having a handle at one end thereof and having a magnetized end portion at the opposite end thereof, the latter adapted to magnetically receive and hold a speed nut thereon so that the same may be pushed manually into engagement with said associated members by means of said tool, a spring operated inertia element slidably supported by said body for movement toward and away from said magnetic end including a head portion and a plunger portion extending rearwardly from said head, trigger means pivotally mounted in said handle, latch means pivotally mounted in said trigger and adapted to releasably engage the rear end of said plunger, whereby when said trigger is squeezed said inertia element is cocked, and means adjustably mounted in said handle adapted to contact said latch means at a predetermined point upon rearward movement of said trigger whereby to release said spring operated inertia element to permit the same to move forwardly and strike said magnetized end and deliver a final setting blow to the speed nut after it has been applied to the associated member.

2. A tool for applying speed nuts to associated members so as to secure the latter together comprising a body having a handle at one end thereof and having a magnetized end portion at the opposite end thereof, the latter adapted to magnetically hold a speed nut thereon so that the latter may be pushed manually into engagement with the associated members by means of said tool, a spring operated inertia element slidably supported by said body for movement toward and away from said magnetic end and adapted to sharply strike the latter to deliver a final setting blow to the speed nut, said spring operated inertia element including a head portion adapted to strike said magnetic end portion and a plunger extending rearwardly from said head portion and having an annular shoulder formed on the rear end thereof, trigger means pivotally mounted in said handle, a latch member pivotally mounted in said trigger means and having a lip formed on the forward end thereof adapted to releasably engage the shoulder on the rear end of the plunger, resilient means normally urging said latch element into engagement with said plunger shoulder, cam means mounted in said handle and adapted to abut said latch element upon rearward movement of said trigger means to release said latch from said plunger, and thereby permit the inertia element to move forwardly and strike said magnetic handle end portion.

3. A tool for applying speed nuts to associated members so as to secure the latter together comprising a body having a handle at one end thereof and having a magnetized end portion at the opposite end thereof, the latter adapted to magnetically hold a speed nut thereon so that the latter may be pushed manually into engagement with the associated members by means of said tool, a spring operated inertia element slidably supported by said body for movement toward and away from said magnetic end and adapted to sharply strike the latter to deliver a final setting blow to the speed nut, said spring operated inertia element including a head portion adapted to strike said magnetic end portion and a plunger extending rearwardly from said head portion and having an annular shoulder formed on the rear end thereof, trigger means pivotally mounted in said handle, a latch member pivotally mounted in said trigger means and having a lip formed on the forward end thereof adapted to releasably engage the shoulder on the rear end of the plunger, resilient means normally urging said latch element into engagement with said plunger shoulder, adjustable cam means mounted in said handle and adapted to abut said latch element upon rearward movement of said trigger means to release said latch from said plunger at a predetermined point, and thereby permit the inertia element to move forwardly and strike said magnetic handle end portion.

4. A tool for applying speed nuts to associated members so as to secure the latter together including a generally inverted U-shaped handle, the rear leg of which forms a hand grip for said tool, a cylindrical hollow body secured to the front leg of said handle and extending forwardly therefrom, the forward end of said body being thickened to provide a thickened end having a tapped aperture therethrough, a magnetized end element threadably received in said housing tapped aperture and adapted to receive and hold a speed nut so that the latter may be pushed manually into engagement with said associated members by means of said tool, a spring operated inertia element including a head portion and a plunger portion slidably mounted in said cylindrical body and movable toward and away from said magnetic end member, the rear end of said plunger projecting rearwardly through the front leg of said handle and having an annular shoulder formed thereon, trigger means pivotally mounted in the upper end of said handle, latch means pivotally mounted in said trigger means intermediate the ends thereof and having a lip formed on the forward end thereof adapted to releasably engage said annular shoulder on said plunger, and an inclined face formed on the rear end of said latch means, resilient means disposed between said trigger means and the forward end of said latch means to normally urge said latch downwardly so as to normally engage the annular shoulder on said plunger, and cam means adjustably mounted in said handle rear leg adapted to engage said inclined rear end face of said latch when said trigger is squeezed and thereby cam said latch element out of engagement with said plunger to permit said inertia element to move forwardly and strike said body thickened wall to set said speed nut.

5. A tool for applying speed nuts to associated members so as to secure the latter together including a generally inverted U-shaped handle, the rear leg of which forms a hand grip for said tool, a cylindrical hollow body secured to the front leg of said handle and extending forwardly therefrom, the forward end of said body being thickened to provide a thickened end wall having a tapped aperture therethrough, a magnetized end element threadably received in said housing tapped aperture and adapted to receive and hold a speed nut so that the latter may be pushed manually into engagement with said associated members by means of said tool, a spring operated inertia element including a head portion and a plunger portion slidably mounted in said cylindrical housing and movable toward and away from said magnetic end member, the rear end of said plunger projecting rearwardly through the front leg of said handle and having an annular shoulder formed thereon, trigger means pivotally mounted in the upper end of said handle, latch means pivotally mounted in said trigger means intermediate the ends thereof and having a lip formed on the forward end thereof adapted to releasably engage said annular shoulder on said plunger, and an inclined face formed on the rear end of said latch means, resilient means disposed between said trigger means and the forward end of said latch means to normally urge said latch downwardly so as to engage the annular shoulder on said plunger, means for limiting the downward movement of the forward end of said latch, cam means adjustably mounted in said handle rear leg adapted to engage said inclined rear end face of said latch when said trigger is squeezed and cam said latch element out of engagement with said plunger to thereby permit said inverted element to move forwardly and strike said end wall to set said speed nut, and resilient means for returning said trigger to its forward position after it has been squeezed and released.

6. A tool for applying speed nuts to associated members so as to secure the latter together including a generally inverted U-shaped handle, the rear leg of which forms a hand grip for said tool, a cylindrical hollow body secured to the front leg of said handle and extending forwardly therefrom, the forward end of said housing being thickened to provide a thickened end wall having a tapped aperture therethrough, a magnetized end element threadedly received in said housing tapped aperture having an axial slot extending rearwardly from the forward end thereof adapted to receive and hold a speed nut so that the latter may be pushed manually into engagement with said associated members by means of said tool, a spring operated inertia element including a head portion and a plunger portion slidably mounted in said cylindrical body and movable toward and away from said magnetic end member, the rear end of said plunger projecting rearwardly of the front leg of said handle and having an annular shoulder formed thereon, trigger means pivotally mounted in the upper end of said handle, latch means pivotally mounted in said trigger means intermediate the ends thereof and having a lip formed on the forward end thereof adapted to releasably engage said annular shoulder on said plunger, and an inclined face formed on the rear end of said latch means, resilient means disposed between said trigger means and the forward end of said latch means to normally urge said latch downwardly so as to engage the annular shoulder on said plunger, means for limiting the downward movement of the forward end of said latch, cam means adjustably mounted in said handle rear leg adapted to engage said inclined rear end face of said latch when said trigger is squeezed and cam said latch element out of engagement with said plunger to thereby permit said inertia element to move forwardly and strike said body thickened end wall to set said speed nut, and resilient means for returning said trigger to its forward position after it has been squeezed and released.

7. A tool for applying a speed nut to a shank element so as to secure together associated members including a generally inverted U-shaped handle, the rear leg of which forms a hand grip for said tool, a cylindrical hollow body secured to the front leg of said handle and extending forwardly therefrom, the forward end of said housing being thickened to provide a thickened end wall having a tapped aperture therethrough, a magnetized end element threadably received in said housing tapped aperture having an axial slot extending rearwardly from the forward end thereof adapted to receive and hold a speed nut and having the opposite faces of said slot formed with longitudinal recesses adapted to receive said shank element when said speed nut is applied thereto to center said tool and guide it during the applying operation, so that the speed nut may be pushed by said magnetized end element into engagement with said associated members by means of said tool, a spring operated inertia element including a head portion and a plunger portion slidably mounted in said cylindrical body and movable toward and away from said magnetic end member, the rear end of said plunger projecting rearwardly of the front leg of said handle and having an annular shoulder formed thereon, trigger means pivotally mounted in the upper end of said handle, latch means pivotally mounted in said trigger means intermediate the ends thereof and having a lip formed on the forward end thereof adapted to releasably engage said annular shoulder on said plunger, and an inclined face formed on the rear end of said latch means, resilient means disposed between said trigger means and the forward end of said latch means to normally urge said latch downwardly so as to engage the annular shoulder on said plunger, means for limiting the downward movement of the forward end of said latch, cam means adjustably mounted in said handle rear leg adapted to engage said inclined rear end face of said latch when said trigger is squeezed and cam said latch element out of engagement with said plunger to thereby permit said inertia element to move forwardly and strike said body thickened end wall to set said speed nut, and resilient means for returning said trigger to its forward position after it has been squeezed and released.

WILLLIAM P. HAMMERS.

REFERENCES CITED

The following references are of record in the file of this patent:

UNITED STATES PATENTS

| Number | Name | Date |
|---|---|---|
| 913,677 | Ainsworth | Mar. 2, 1909 |
| 1,341,373 | Komatar | May 25, 1920 |
| 1,601,324 | Reynolds | Sept. 28, 1926 |
| 1,851,773 | Peterson et al. | Mar. 29, 1932 |
| 1,867,041 | Walters | July 12, 1932 |
| 1,977,362 | Wakstein | Oct. 16, 1934 |
| 2,177,232 | Tinnerman | Oct. 24, 1939 |
| 2,315,209 | Kost | Mar. 30, 1943 |